Aug. 19, 1952  C. A. HARTUNG  2,607,911
MEASURING AND CONTROLLING APPARATUS
Original Filed Jan. 10, 1947
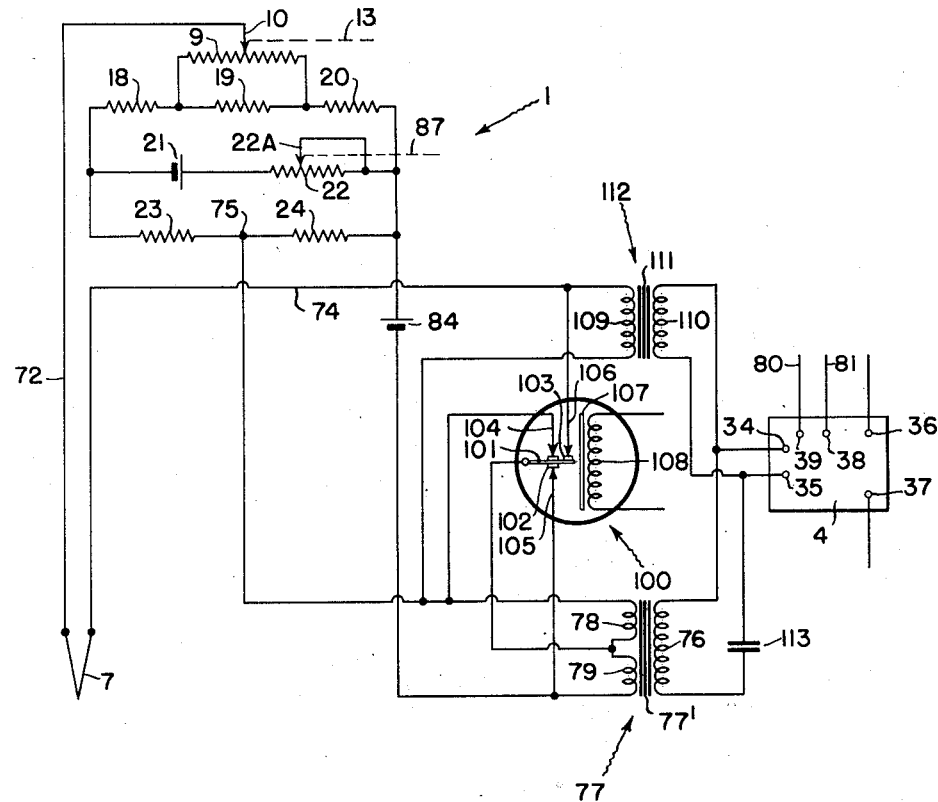
*INVENTOR.*
CHARLES A. HARTUNG
BY Arthur H. Swenson
ATTORNEY.

Patented Aug. 19, 1952

2,607,911

UNITED STATES PATENT OFFICE 2,607,911

MEASURING AND CONTROLLING APPARATUS

Charles A. Hartung, Ridley Park, Pa., assignor to Minneapolis-Honeywell Regulator Company, Minneapolis, Minn., a corporation of Delaware Original application January 10, 1947, Serial No. 721,242, now Patent No. 2,520,462, dated August 29, 1950. Divided and this application June 30, 1949, Serial No. 102,193

4 Claims. (Cl. 321—45)

The present invention is a division of my prior application, Serial No. 721,242, filed January 10, 1947, now Patent No. 2,520,462 of August 29, 1950, which relates to measuring apparatus of the balanceable potentiometric type, and especially to improve means for maintaining such potentiometric measuring apparatus continuously standardized.

The present invention was primarily devised for use in measuring apparatus of the type in which minute uni-directional voltage variations are converted into similar alternating voltage variations which may readily be amplified by electronic amplifying devices, and is particularly well adapted for use with self-balancing potentiometric systems to provide continuous automatic standardizing, assuring a constant supply of energizing voltage to the potentiometric measuring circuit at all times, and hence assuring highly accurate results in measurements made over extended periods of time.

A general object of the present invention is to provide an improved converter arrangement for converting uni-directional current into alternating current.

According to the present invention, the converter arrangement comprises a transformer having a primary winding on which the uni-directional voltage is impressed and having a secondary winding, and switching means adapted to be operated by alternating current and operative to short-circuit one half of the primary winding once during a portion only of the first half of each cycle of the alternating current, and to short-circuit the other half of the primary winding once during a portion only of the second half of each cycle of the alternating current, for creating in the secondary winding of the transformer an alternating voltage having a magnitude which is proportional to the magnitude of the uni-directional voltage, and having a frequency which is twice that of the alternating current.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

There is illustrated in the single figure of the drawing the circuit diagram of a portion of a well-known form of self-balancing potentiometric measuring apparatus of the type disclosed and claimed in the Wills Patent 2,423,540. The apparatus illustrated in the drawing comprises a potentiometric measuring circuit generally designated at 1, a vibrating reed converter 100, an input transformer 112, and an electronic voltage amplifier 4. These units operate together and cooperate with a power amplifier and motor drive circuit and with a two-phase reversible rebalancing induction motor, not shown, to effect the measurement of a minute uni-directional potential in a manner which is described in my aforementioned prior patent and which is also described in detail in said Wills patent.

In the drawing, the potentiometric system is shown by way of illustration as being connected to measure the instantaneous values of the temperature of a thermocouple 7. To this end, the potentiometric circuit 1 includes a slide-wire resistance 9 having a sliding contact 10. The contact 10 is moved laterally by a suitable mechanical linkage 13 connected to the aforementioned rebalancing motor. The measuring system operates in a manner well known to those skilled in the art to cause the sliding contact 10 to be moved along the slide-wire resistance 9 by operation of the motor so that the contact 10 is positioned according to the instantaneous temperatures of the thermocouple 7.

In addition to the slide-wire resistance 9, the circuit 1 comprises three parallel-connected branches. The first of these is a measuring branch, including three resistors 18, 19 and 20, connected in series. The slide-wire resistance 9 is connected in parallel with the resistor 19, the latter being located between the resistors 18 and 20. The second parallel branch is an energizing branch including a battery 21 and a variable resistor 22, having a sliding contact 22A, connected in series. The third branch is a compensating branch, including a thermocouple cold junction compensating resistor 23 and a standardizing resistor 24 connected in series.

The converter 100 comprises a vibratile reed 101 which carries contacts 102 and 103, relatively stationary contacts 104, 105, and 106, a permanent magnet 107, and an operating coil 108. The several contacts are so arranged in the converter 100 that the contacts 103 and 106 are in engagement whenever the contacts 102 and 104 are engaged, and the contacts 103 and 106, and 102 and 104, are out of engagement whenever the contacts 102 and 105 are engaged. In the manner described in my aforementioned prior patent, energization of the coil 108 with alternating current causes the reed 101 to be vibrated between the upper and lower relatively stationary contacts at the frequency of the energizing alternating current.

The input transformer 112 comprises a primary winding 109 and a secondary winding 110 suitably wound on a core 111. As shown, one terminal of the thermocouple 7 is connected by a conductor 72 to the sliding contact 10 of the slide-wire resistance 9. A point 75, constituting the junction between the connected ends of the resistors 23 and 24 of the circuit 1, is connected to one end terminal of the primary winding 109. The point 75 is also connected to the converter contact 104. The remaining end terminal of the primary winding 109 is connected to the converter contact 106 and to the remaining terminal of the thermocouple 7 by a conductor 74.

The electronic voltage amplifier 4 may be of any suitable type, such as the type disclosed in the aforementioned Wills patent. The amplifier 4 includes input terminals 34 and 35, output terminals 36 and 37, and energizing terminals 38 and 39.

The secondary winding 110 of the transformer 112 is connected across the input terminals 34 and 35 of the amplifier 4. The amplifier energizing terminals 38 and 39 are connected by conductors 81 and 80 to a suitable source of alternating energizing current, not shown, of suitable frequency. This frequency may, for example, be 60 cps. The converter operating coil 108 is adapted to be energized with alternating current from the same source which energizes the amplifier 4.

The amplifier output terminals 36 and 37 are adapted to be connected to the aforementioned unillustrated power amplifier and motor drive circuit. The output of the latter is adapted to be connected to the aforementioned unillustrated reversible rebalancing motor which positions the contact 10 through the linkage 13. These components and interconnections are all illustrated and described in detail in my aforementioned prior patent.

When the slide-wire contact 10 is in the position along the slide-wire resistance 9 which corresponds to the then instantaneous temperature of the thermocouple 7, the potentiometric system is said to be balanced, and no voltage appears between the potentiometric output terminal 75 and the output conductor 74. Consequently, no input voltage is applied to the input transformer 112, and no signal is applied between the amplifier input terminals 34 and 35. Under this condition, the contact 10 is prevented from moving relative to the slide-wire resistance 9 as long as the system remains balanced.

Upon a subsequent increase in the temperature of the thermocouple 7 above the temperature value at which the system was balanced as just described, the potentiometric circuit becomes unbalanced, and a unidirectional voltage appears in the output of the circuit 1, between the point 75 and the conductor 74, having a magnitude proportional to the magnitude of the temperature increase and hence to the extent of the potentiometric circuit unbalance, and having a given polarity corresponding to a temperature increase. This voltage is alternately applied across the input transformer primary winding 109, due to the operation of the converter 100. Since the converter coil 108 is assumed to be energized with 60 cycle alternating voltage, the potentiometric unbalanced voltage is applied to the transformer primary winding 109 during the first half of each cycle of the alternating supply voltage, but is short-circuited around the winding 109 by the action of the stationary contacts 104 and 106 and the cooperating reed contacts 102 and 103 during the second half of each of said cycles, with the result that an alternating current signal is developed across the transformer secondary winding 110 having a magnitude proportional to the magnitude of the temperature increase and to the extent of the potentiometric unbalance, having a frequency of 60 cycles per second, and having a given phase corresponding to a temperature increase.

The signal just described is applied to the input of the amplifier 4, wherein it is amplified, and the resulting signal is utilized to control the aforementioned amplifier and motor drive circuit as described in my prior patent mentioned above. The motor drive circuit then delivers to the rebalancing motor a signal of such phase and magnitude that the rotor of the motor is caused to rotate in such a manner as to drive the contact 10 along the slide-wire resistance 9 up scale or to the right in the drawing to a new balance position corresponding to the new, increased temperature. When the contact 10 has been moved into this position, the system is once more balanced, and the motor rotor and contact 10 are prevented from further movement until a subsequent thermocouple temperature change takes place.

Upon a subsequent decrease in the thermocouple temperature, the converse of what has just been described takes place. Specifically, a unidirectional voltage appears between the point 75 and the conductor 74 having a magnitude proportional to the magnitude of the temperature decrease and having a polarity opposite to that corresponding to a temperature increase. By the conjoint action of the converter 100 and transformer 112, this voltage is converted into a 60 cycle alternating current signal which appears between the amplifier input terminals 34 and 35 having a magnitude proportional to the magnitude of the temperature decrease, and being of opposite phase with respect to the corresponding signal produced by a temperature increase. The signal is amplified by the amplifier 4 and is fed to the motor drive circuit, which delivers to the rebalancing motor a signal of such phase and magnitude that the motor is caused to drive the contact 10 down scale or to the left in the drawing to a new balance position corresponding to the new, decreased temperature. When the contact 10 has moved to this position, the system is once more balanced, and the motor and contact 10 are prevented from further movement until a subsequent temperature change takes place.

The manner in which the apparatus herein described functions to perform the operations outlined above is described in detail in my aforementioned prior patent and in the aforementioned Wills Patent 2,423,540, and hence no further description thereof will be made herein.

The continuous automatic standardizing apparatus of the illustrated arrangement comprises a standard cell 84, an input transformer 77, the converter 100, the amplifier 4, a suitable power amplifier and motor drive circuit not shown, a two-phase reversible standardizing motor, not shown, and a mechanical linkage 87. The input transformer 77 comprises a core 77', two primary winding sections 78 and 79 and a secondary winding 76.

The rotor of the standardizing motor is mechanically coupled by means of the link 87 to the sliding contact 22A of the variable resistor 22, which is connected in the potentiometric circuit energizing branch. This coupling is such that rotation of the standardizing motor in one direction moves the contact 22A along the resistor 22 to increase the resistance of the latter, and hence, decreases the energizing current flowing in the potentiometric circuit 1. Rotation of the standardizing motor in the opposite direction moves the contact 22A to decrease the resistance of the resistor 22, and hence, to increase the potentiometric energizing current.

The input portion of the continuous automatic standardizing apparatus is connected in a novel manner which causes the signal developed in the transformer secondary winding 76 to have a frequency of 120 cycles per second, which is twice the frequency of the alternating voltage used to energize the operating coil 108 of the converter 100.

For the purpose of causing the frequency of the voltage created in the secondary winding 76 of the input transformer 77 to have a frequency which is twice that of the alternating supply voltage, the converter contact 104 is connected to one end terminal of the standardizing input transformer primary winding section 78 and to the point 75 of the potentiometric measuring circuit 1. The converter contact 105 is connected to one end terminal of the transformer primary winding section 79 and to one terminal of the standard cell 84. The remaining terminal of the latter is connected to one end of the resistor 24, and the remaining end terminals of the transformer primary winding sections are connected together and to the converter reed and contacts 102 and 103.

As shown, the transformer primary winding sections 78 and 79 of the standardizing input transformer 77 are normally connected in series with the standard cell 84 and the standardizing resistor 24. Any current produced by a need for standardizing will therefore flow through the windings 78 and 79. However, as the converter contact 102 alternately engages the contacts 104 and 105, the windings 78 and 79 are alternately short-circuited, each winding being so short-circuited once each cycle of the converter energizing voltage. Since the converter coil is energized with 60 cycle current, the short-circuiting of the two primary windings 78 and 79 each cycle causes a 120 cycle signal to be produced in the secondary winding 76 as a result of a need for standardizing.

The secondary winding 76 of the transformer is connected in series with a condenser 113 between the amplifier input terminals 34 and 35. Therefore, when both of the measuring and standardizing circuits are simultaneously unbalanced, a complex signal is applied between the input terminals 34 and 35. Therefore, when this occurs, a complex signal is applied between the input terminals 34 and 35 consisting of a 60 cycle component from the transformer 112 and the measuring circuit, representative of measuring circuit unbalance, and a 120 cycle component from the transformer 77 and the standardizing circuit, representative of standardizing circuit unbalance. Due to the effect of the condenser 113, the 120 cycle standardizing signal component will be shifted in phase through 45° of the 60 cycle measuring signal component for a reason to be described hereinafter.

When either the 60 cycle signal or the 120 cycle signal or both are applied to the input of the amplifier 4, the amplified resultant of the input signal will be applied to both the aforementioned measuring motor drive circuit and the aforementioned standardizing motor drive circuit. As described in detail in my aforementioned prior patent, the measuring motor drive circuit is operative to produce a signal to cause operation of the associated rebalancing motor only in response to a 60 cycle input signal.

Consequently only a 60 cycle signal in the output of the amplifier 4 between the terminals 36 and 37 will cause operation of the rebalancing motor, any 120 cycle signal, if present, having no effect on the rebalancing motor. Therefore, the rebalancing motor operates solely in response to measuring circuit unbalance to effect rebalancing of the potentiometric circuit 1 as previously brought out.

As fully described in my aforementioned prior patent, the standardizing motor drive circuit is operative to effect rotation of the standardizing motor only in response to a 120 cycle output signal from the amplifier 4 which is shifted in phase 45° with respect to the supply voltage phase. Consequently, only such a 120 cycle signal will produce operation of the standardizing motor, any 60 cycle signal, if present in the output of the amplifier 4, having no effect on the operation of the standardizing motor. Therefore, the standardizing motor drive circuit and standardizing motor respond only to standardizing circuit unbalance to effect rebalancing of the standardizing circuit and standardization of the potentiometric apparatus.

As is evident from the description of the apparatus previously given, the resistor 24 and the standard cell 84 are connected in series with the primary winding sections 78 and 79 of the transformer 77. This connection is made in such a manner that the voltage drop across the resistor 24 opposes the E. M. F. of the standard cell 84, so that when this voltage drop is just equal in magnitude to the standard cell E. M. F., no current flows in the transformer primary winding sections 78 and 79. Therefore, when the energizing current flowing in the circuit 1 and produced by the battery 21 is of the correct value to produce the normal voltage drop across the slide-wire resistance 9, no current flows through the winding sections 78 and 79. Under this condition, the standardizing circuit is balanced and the contact 22A is held stationary on the resistor 22.

If the terminal voltage of the battery 21 decreases below the value responsible for the balanced condition of the standardizing circuit as just described, the energizing current flowing in the circuit 1 will decrease in magnitude and consequently the voltage drop across the resistor 24 will decrease. This voltage drop will now not be equal and opposite to the standard cell E. M. F., and hence a current will flow in the transformer primary winding sections 78 and 79. This current through the sections 78 and 79 will be a pulsating one however, due to the periodic short-circuiting action of the converter contacts 102, 104 and 105.

As a result of this pulsating current flowing through the winding sections 78 and 79, an alternating current signal will appear across the secondary winding 76 and between the amplifier input terminals 34 and 35 having a frequency of 120 cycles per second, having a magnitude proportional to the extent of the energizing current decrease, and being of a given phase corresponding to a decrease in potentiometric energizing current and battery voltage.

The signal applied to the input of the amplifier 4 is amplified therein in the conventional manner and is applied to the input terminals of the aforementioned standardizing power amplifier and motor drive circuit. The latter functions to produce in response to this signal a motor drive signal which is applied to the standardizing motor. This drive signal is of such phase and magnitude as to cause the standardizing motor to rotate and to move the sliding contact 22A along the resistor 22 in a direction to decrease the effective resistance of the latter and hence to increase the potentiometer energizing current. The standardizing motor will continue to thus drive the contact 22A to increase the energizing current until the latter has once more reached its normal value. When this occurs, the voltage drop across the resistor 24 will once more be equal and opposite to the standard cell E. M. F., no 120 cycle signal will be applied to the amplifier 4, the standardizing circuit will again be balanced, and the contact 22A will be prevented from having further motion until a subsequent change takes place in the voltage of the battery 21.

If the terminal voltage of the battery 21 should increase, the standardizing system will function in such a manner that the standardizing motor will drive the contact 22A to increase the effective resistance of the resistor 22 and hence decrease the potentiometric energizing current. This will continue until the energizing current is returned to its normal value and the standardizing circuit is once more in balance.

From the description just given, it can be seen that the response of the standardizing system to an unbalance of this system, due to a change in the terminal voltage of the battery 21, is analogous to the response of the potentiometric measuring system to an unbalance due to a change in the temperature being measured by the thermocouple 7. Similarly, the manner in which the standardizing system functions to restore the energizing current of the potentiometric system to its normal value, and hence to rebalance the standardizing system, is analogous to the manner in which the potentiometric measuring system functions to restore the condition of zero potentiometric circuit output voltage, and hence to rebalance the measuring system. It is to be noted, however, that unbalance and rebalancing of the measuring system in no way affects the standardizing system, and that rebalancing of the latter in no way affects the measurements made by or the operation of the measuring system. This latter statement is true since the standardizing system is in continuous operation, and, therefore, any minute change in the terminal voltage of the battery 21 is compensated for by an adjustment of the resistor 22 before such a change can affect the accuracy of the measurements made by the potentiometric measuring system.

It may be noted that the arrangements disclosed herein for providing continuous automatic standardizing may be effectively employed when the energizing battery 21 is replaced by a rectifier and a suitable source of alternating current as potentiometric circuit energizing means.

While, in accordance with the provisions of the statutes, I have illustrated and described the best form of embodiment of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure with Letters Patent is:

1. In combination, a transformer having a primary winding adapted to have a unidirectional potential impressed thereacross and having a secondary winding, and switching means adapted to be operated by alternating current and operative to short-circuit one half of said primary winding once during a portion only of the first half of each cycle of the alternating current and to short-circuit the other half of said primary winding once during a portion only of the second half of each cycle of the alternating current, thereby to produce across said secondary winding an alternating potential having a magnitude which is proportional to that of the unidirectional potential, and having a frequency which is twice that of the alternating current.

2. In combination, a transformer having two substantially identical primary windings and a secondary winding, a first pair of conductors adapted to have a unidirectional potential produced therebetween, connections between said conductors and each of said primary windings whereby the unidirectional potential between said conductors is normally applied to said primary windings, a second pair of conductors adapted to have an alternating potential produced therebetween, and switching means operated by the alternating potential between said second pair of conductors and adapted to short-circuit one of said primary windings once during a portion only of the first half of each of the cycles of the alternating potential and to short-circuit the other of said primary windings once during a portion only of the second half of each of the cycles of the alternating potential, thereby to cause an alternating potential to be produced across said secondary winding having a magnitude which is proportional to that of the unidirectional potential and having a frequency which is twice that of the first mentioned alternating potential.

3. In combination, a transformer having a primary winding adapted to have a unidirectional potential produced thereacross and having a secondary winding, an electro-mechanical vibrating reed converter having an operating coil adapted to be energized with alternating current and having a moving contact and two relatively stationary contacts, and connections between said transformer and said converter whereby said moving contact and one of said stationary contacts cause one half of said primary winding to be short-circuited once during a portion only of the first half of each cycle of the alternating current and whereby said moving contact and the other of said stationary contacts cause the other half of said primary winding to be short-circuited once during a portion only of the second half of each cycle of the alternating current, said connections being so made that an alternating potential appears across said secondary winding having a magnitude which is proportional to the unidirectional potential, and having a frequency which is twice that of the alternating current.

4. In combination, a transformer having a primary winding adapted to have a unidirectional potential produced thereacross and having a secondary winding, said primary winding also having an end terminal at each end and a center-tap, an electro-mechanical, vibrating reed converter having a movable contact, two stationary contacts, and an operating coil adapted to be energized with alternating current and operative to move said movable contact into and out of engagement with one of said stationary contacts once during the first half of each cycle of the alternating current and to move said movable contact into and out of engagement with the other of said stationary contacts once during the second half of each cycle of the alternating current, a connection between one of said end terminals and said one stationary contact, a connection between the other of said terminals and said other stationary contact, and a connection between said center-tap and said movable contact whereby an alternating potential is produced across said secondary winding having a magnitude which is proportional to that of the unidirectional potential and having a frequency which is twice that of the alternating current.

CHARLES A. HARTUNG.

REFERENCES CITED

The following references are of record in the file of this patent:

UNITED STATES PATENTS

| Number | Name | Date |
| --- | --- | --- |
| 2,443,100 | Edwards | June 8, 1948 |